US008935662B2

(12) United States Patent
Pasternak

(10) Patent No.: US 8,935,662 B2
(45) Date of Patent: Jan. 13, 2015

(54) GENERATING PERSISTENT VARIABLES IN A SHELL ENVIRONMENT

(75) Inventor: Michael Pasternak, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 969 days.

(21) Appl. No.: 13/028,109

(22) Filed: Feb. 15, 2011

(65) Prior Publication Data

US 2012/0210299 A1    Aug. 16, 2012

(51) Int. Cl.
*G06F 9/44*    (2006.01)

(52) U.S. Cl.
CPC .................................. *G06F 9/4435* (2013.01)
USPC ........................................................ 717/115

(58) Field of Classification Search
CPC .............. G06F 9/4435; G06F 9/45512; G06F 11/0766; G06F 11/0769; G06F 11/0775; G06F 11/0778; G06F 11/0787
USPC ........................................................ 717/115
See application file for complete search history.

(56) References Cited

U.S. PATENT DOCUMENTS

| 7,467,374 | B2 * | 12/2008 | Nishanov et al. | 717/128 |
|---|---|---|---|---|
| 7,657,873 | B2 * | 2/2010 | Horton et al. | 717/125 |
| 7,840,856 | B2 * | 11/2010 | Apte et al. | 714/48 |
| 2003/0182596 | A1 * | 9/2003 | Broussard et al. | 714/34 |
| 2008/0244324 | A1 * | 10/2008 | Schmelter | 714/38 |
| 2009/0013208 | A1 * | 1/2009 | DiMuzio | 714/2 |
| 2010/0268952 | A1 * | 10/2010 | Chung et al. | 713/170 |
| 2010/0318543 | A1 * | 12/2010 | Chaudhuri et al. | 707/759 |
| 2012/0137181 | A1 * | 5/2012 | Thompson | 714/48 |

OTHER PUBLICATIONS

Anonymous, "JSON and XML Dynamic Serialization of Java Objects," IP.com, 2010, 4pg.*
Deshev, Hristo, "ProWindows PowerShell," ch. 9, Springer-Verlag, 2008, 56pg.*
Ryan et al., "Schema for Representing Java(tm) Objects in an LDAP Directory," IP.com, 1999, 18pg.*
van Weelden et al., "A Functional Shell That Dynamically Combines Compiled Code," Springer-Verlag, 2004, 17pg.*

* cited by examiner

*Primary Examiner* — Ryan Coyer
(74) *Attorney, Agent, or Firm* — Lowenstein Sandler LLP

(57) ABSTRACT

A computing device executes one or more applications within a shell session, such as a Powershell session. The computing device may detect, within the shell session, a runtime exception that causes the shell session to prematurely terminate. The computer device serializes an object associated with the runtime exception prior to closure of the shell session. The computer device may also serialize other objects. Serializing the object includes identifying the object's type, identifying data associated with the object's type, identifying internal types of the object, and identifying data associated with each of the internal types, and generating a representation of the object that preserves the object's type, the data included in the object, and all internal types of the object.

18 Claims, 5 Drawing Sheets

GENERATING PERSISTENT VARIABLES IN A SHELL ENVIRONMENT

TECHNICAL FIELD

The embodiments of the present invention relate generally to serializing objects, and more specifically to generating persistent variables in a shell such as Windows Powershell by serializing objects and storing the serialized objects in a database.

BACKGROUND

Windows® Powershell® is an extensible automation engine consisting of a command-line shell and an associated scripting language. Administrative tasks within Powershell are performed by execution of cmdlets, which are specialized .NET classes implementing particular operations. Such cmdlets may be combined by means of scripts, (compositions of cmdlets along with imperative logic), executables (standalone applications), and/or regular .NET classes (e.g., WMI/COM objects). Cmdlets perform actions, and typically return an object, which may be provided to a next command in a pipeline.

Objects in Powershell are not natively persistent. Therefore, objects only exist within a particular Powershell session or terminal window, and are deleted as soon as the session or terminal window terminates.

One cmdlet for Powershell, called "export-cliXML," serializes objects into a file. However, the export-cliXML cmdlet has a number of drawbacks that render this cmdlet insufficient for many purposes. Specifically, the export-cliXML cmdlet does not include a data protection or verification mechanism. Therefore, once an object has been serialized to a file, there is no way to tell whether the file has been tampered with or contains corrupt data. Additionally, the export-cliXML cmdlet has no type safety mechanism. Therefore, when an object is serialized, that object's type may be lost, and the object may be treated as a generic object having a general type when it is later de-serialized. This can be a serious issue, since this causes all unique functionality of the object's original type to be lost.

Powershell includes a basic logging facility, that logs standard input/output events that occur within a Powershell pipe. Notably, the logging facility of Powershell is only capable of logging standard input/outputs. The built in logging facility of Powershell cannot record runtime exceptions or other session events, such as those that cause a Powershell session to terminate.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for a method and apparatus for generating persistent variables (also referred to herein as object representations) in a shell such as Windows Powershell. For the sake of simplicity, the present invention will be described with application to Windows Powershell. However, is should be understood that embodiments of the present invention may also operate in other shell environments in which commands operate on and/or output objects, such as JavaScript Shell or other shells.

In one embodiment, a computing device executing a shell session detects, within the shell session, a runtime exception that causes the shell session to terminate. The computing device serializes an object associated with the runtime exception prior to closure of the shell session. In one embodiment, the object is a runtime exception object that is generated as a result of the runtime exception. Alternatively, the object may be an object that caused the runtime exception to occur. The computing device may also serialize other objects that are not associated with a runtime exception. Serializing the object includes identifying the object's type, identifying data associated with the object's type, identifying internal types of the object, and identifying data associated with those internal types. Serializing the object further includes generating a representation of the object that preserves the object's type, the data associated with the object's type, all internal types of the object, and data associated with those internal types. The computing device then stores the object representation in a database. Additionally, the computing device may generate a hash of the object representation, and store the hash in the database along with the object representation.

Figure 1:
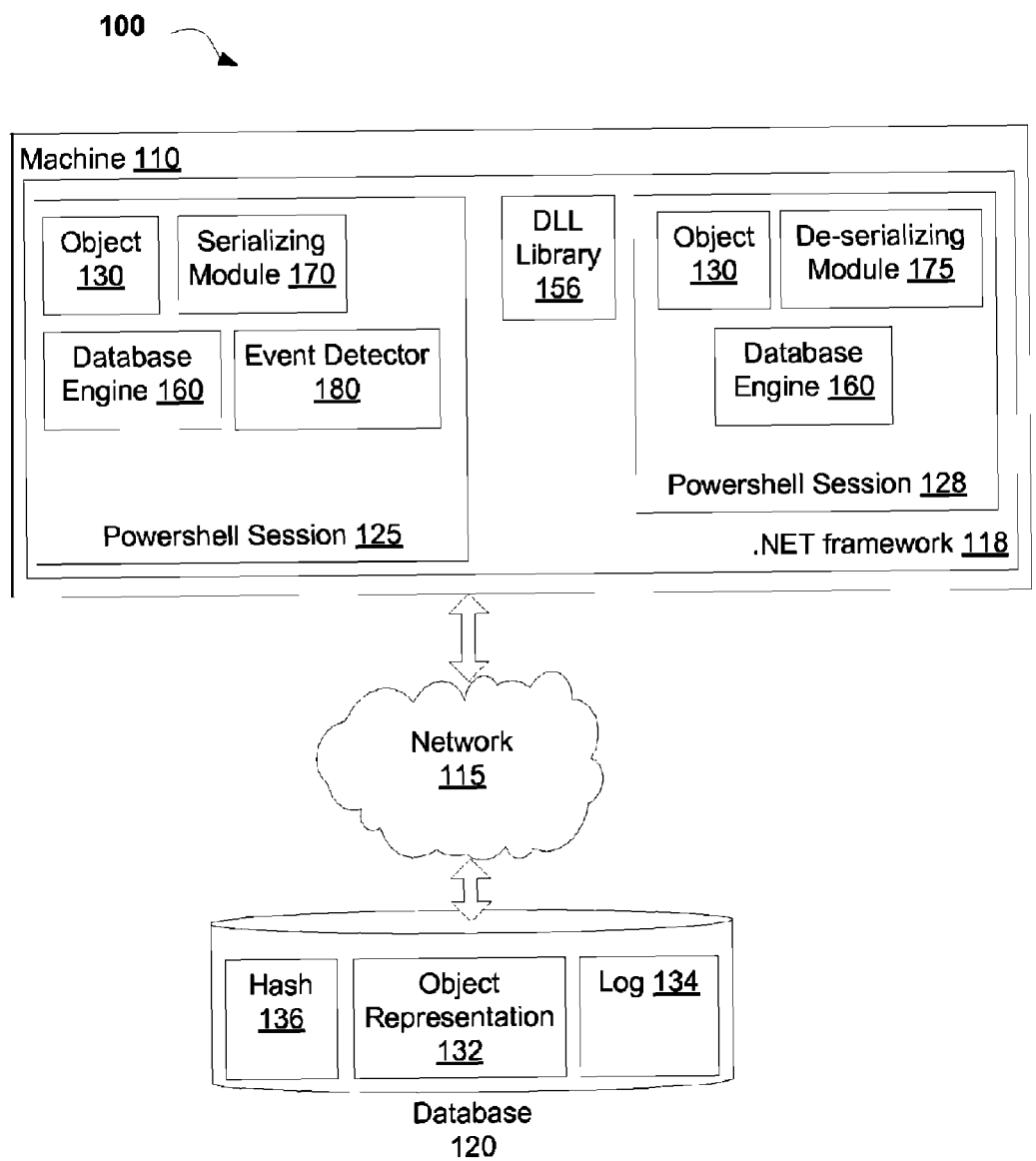
FIG. 1 is a block diagram of a network architecture, in which embodiments of the present invention may operate.

FIG. 1 is a block diagram of a network architecture 100, in which embodiments of the present invention may operate. The network architecture 100 includes a computing device (machine) 110 connected to a database 120 via a network 115. Network 115 may be a private network (e.g., a local area network (LAN), a wide area network (WAN), etc.) or a public network (e.g., the Internet), and may be a combination of one or more networks.

Machine 110 may be a desktop computer, laptop computer, tablet computer, mobile phone, personal digital assistant (PDA), rackmount server, mainframe, or other computing device. Machine 110 includes a base hardware platform (e.g., including a processor, memory, storage, network devices, etc.) and an operating system (e.g., a Windows OS, Linux OS, OS X, etc.) that runs on top of the base hardware platform. In one embodiment, the machine 110 includes a software framework (e.g., .NET framework 118), which may be installed on the OS. Throughout this document, for brevity and simplicity, the .NET framework 118 is used as an example of a software framework. However, it should be understood that embodiments of the present invention may apply to any software framework, such as the Prototype framework, Ruby on Rails framework, etc. Additionally, for embodiments of the present invention that use a shell that is not integrated with a software framework, no software framework may be necessary.

The .NET framework 118 is a software framework that includes a large library (DLL library 156) of coded solutions to common programming problems and a common language infrastructure that manages the execution of programs (e.g., cmdlets) written for the .NET framework. Windows Powershell is an extensible automation engine that runs inside of the .NET framework 118. Powershell includes a command-line shell and an associated scripting language, which is integrated into the .NET framework 118. Multiple instances of Powershell (Powershell sessions 125, 128) can be active on machine 110 concurrently. Each Powershell session is an environment (e.g., a console or terminal window) in which Windows Powershell runs.

Applications running within a Powershell session 125, 128 may generate objects (e.g., such as .NET objects). For example, a common output for a Powershell Cmdlet is an object. This object may then be used as an input for a next Cmdlet in a pipeline. An object is a data structure that can be manipulated by the commands of a programming language. In object oriented programming, an object is a particular instance of a class.

A class is a construct that is used as a template to create objects that have all of the properties of that class. The class describes the state and behavior that objects of the class will have. The class encapsulates state through data placeholders called attributes (or variables), and encapsulates behavior through reusable sections of code called methods. The class that contains (and was used to create) an object can be considered a type for that object. Types for objects are complicated types that have multiple pieces of information and specific properties or attributes. An object's type defines methods that the object can perform, contents of the object, properties of those contents, behaviors of the object, and so on. Objects generated from the same class may share the same data type. Additionally, an object may include multiple internal types. For example, any class can be an internal class of another class. The internal class is one example of an internal type. Additionally, any type can reference other types. The referenced types are another example of an internal type. An object's types may be recursively identified (e.g., an object's outer type may reference an inner type, which may reference another inner type, and so on). Objects used in a Powershell session can have any type.

Serializing module 170 transforms objects 130 into persistent representations of those objects (e.g., persistent variables) based on serializing the objects 130. Serializing module 130 may be a Cmdlet or other command or application. Serializing an object 130 includes identifying the object's type (based on the class from which the object was generated), identifying data included in the object, and generating a representation of the object (object representation 130) that preserves the object's type. The representation of the object is a linear sequence of data (e.g., a stream of bits) that can be easily stored, transmitted, etc. The object representation may be formatted in an extensible markup language (XML) format, a binary format, or another format.

In one embodiment, serializing an object 130 also includes identifying and preserving internal types of the object. The serializing module 170 drills down into the contents of the object, and for each identified internal type, serializing module 170 records information on how that type behaves. The object may have multiple layers or levels. A top level (the root of the object) has a first object type. A next layer may include one or more additional types. Below that layer, a next layer down may have still further internal types, and so on. Serializing module 170 starts at the root of the object and systematically drills down into the inner layers of the object. For each identified object, serializing module 170 may determine what the type is pointing at and the stored data associated with that type. This enables complex objects to be stored accurately. Therefore, the generated representation of the object may preserve all types of the object.

Besides storing an entire object structure, the serializing module 170 may additionally store, for a type or types of the object, an assembly name (and its metadata) in which this type defined. This information can be used to preserve a type safety when the object is de-serialized. Therefore, when the object is de-serialized, a de-serializing module 175 can create a new instance of same object using an assembly in which the object was initially defined. For example, consider example assembly X.dll that defines SomeClass.cs type. When a method from assembly X.dll is invoked, it returns SomeClass object to PowerShell, which may be serialized and saved in database 120. When de-serializing module 175 de-serializes the object, it will de-serialize it on a new PowerShell session, and thus create a new instance of SomeClass.cs exactly as it was defined in X.dll using saved content The serializing module 170 can operate on any object, regardless of that object's type or any internal types. Additionally, serializing module 170 can serialize an entire object array. The object array may include multiple objects and/or relationships between these objects. The types and other information for all objects in the object array may be preserved through the serialization process. For example, an entire Powershell configuration may be saved (e.g., for testing purposes).

In one embodiment, Powershell sessions 125, 128 include a database engine 160 for communicating with the database 120. In one embodiment, the database engine 160 is implemented as a dynamic link library (dll) or other shared library (e.g., if an operating system other than a Windows OS is used) and/or a configuration file that may be stored in the dll library 156. The configuration file may identify, for example, the address of the database 120 to connect to, the type of database, etc.

Once serializing module 170 serializes an object 130, database engine 160 sends the serialized object 130 to database 120. Database 120 then stores the serialized object 130. If database engine 130 is not already running within the Powershell session in which the serialization module 170 is invoked, serialization module 170 automatically initiates the database engine 160.

Powershell includes one or more profiles that are used to automatically load applications within a Powershell session and/or customize a Powershell session (e.g., by adding aliases, functions, variables, etc.). The profile may include pointers to dlls that will be used within the Powershell session (e.g., to dlls within dll library 156) during runtime. Accordingly, when a Powershell session 125, 128 is loaded using a particular profile, the database engine 160 may be loaded automatically from the dll library 156. Alternatively, the database engine 160 may be loaded when an application or command needs to communicate with the database 120. For example, the database engine 160 may be loaded when an application issues a command to load the database engine 160, or when an application attempts to store data.

The database engine 160 manages connections to the database 120. There may be a separate database engine 160 initiated within each Powershell session. The database engine 160 may automatically initiate a connection to the database 120 upon being initiated. Thereafter, the database engine 160 may receive read or write requests for data (e.g., persistent variables), and retrieve or write the requested data from/to the database 120. The database engine 160 may communicate with the database 120 using a standard database communication protocol, such as structured query language (SQL), open database connectivity (ODBC), Java database connectivity (JDBC), etc.

In one embodiment, the database engine 160 generates a hash 136 of an object representation 132 and stores the hash 132 along with the object representation 132 in a database record. The hash may later be used by the database engine 160 to verify data integrity. Alternatively, the serializing module 170 may generate a hash of the object representation 132 and provide the hash 136 to the database engine 160 for storage in the database 120.

Since multiple database engines 160 may be in communication with the database 120 concurrently, each database engine 160 includes functionality for placing read blocks and/or write blocks on data in the database 120. Therefore, only a single database engine 160 may write to a particular object representation 132 at a time, and an object representation 132 may not be modified by a database engine 160 while another database engine 160 is reading the object representation 132. This enables multiple database engines 160 to run concurrently without interfering with one another.

The database 120 includes a hardware platform that includes, for example, storage (including disk drives, memory, etc.), a processing device, a bus, etc. The database 120 further includes an organized collection of data stored in the storage, and a database management system for managing the data. The database 120 may be any type of database, such as a MySQL database, a Microsoft Access database, an Oracle Database, etc. In one embodiment, the database is regularly backed up. Therefore, if any contents of the database 120 are corrupted or lost, a backup may be used to retrieve those contents.

If an application (e.g., cmdlet) within Powershell session 128 needs to use the object 130, it invokes de-serializing module 175, which sends a request for object representation 132 to database engine 160. If database engine 160 is not already running, then de-serializing module 175 invokes the database engine 160. Database engine 160 retrieves the serialized object 130 from the database 120 and passes it to de-serializing module 175. De-serializing module 175 then reconstructs the object 130 from the serialized object 130. The reconstructed object has the proper type, including all internal types and associated data for the object.

Applications can therefore use serialized objects (object representations 132) and the database 120 to communicate with applications running in other Powershell sessions. This improves the capabilities of Powershell sessions.

In one embodiment, database engine 160 verifies the integrity of data before providing it to de-serializing module 175. The object representation 132 is received from the database 120 along with a hash of the object representation. Database engine 160 may generate a new hash of the object representation and compare the new hash to the received hash. If the two hashes do not match, then it is determined that the object representation has been modified or corrupted, and that the object cannot be reconstructed. The object representation may then be retrieved from a backup of the database 120 that was generated before the object representation 132 was modified. If the new hash matches the received hash, database engine 160 passes the object representation to de-serializing module 175, which reconstructs the original object from the object representation. This includes generating a new object from a particular class and populating the new object with data included in the object representation. After the object is reconstructed, it may be passed back to the requestor (e.g., to a Cmdlet that asked for the object).

In one embodiment, Powershell session 125 includes an event detector 180. The event detector 180 may be a cmdlet or dll that is included in a Powershell profile. Accordingly, event detector 180 may automatically be loaded when a Powershell session 125 is initiated. Event detector 180 listens for session events or runtime exceptions. For example, when a custom cmdlet fails and throws an error to a standard error output stream (a preconnected output channel between an application (e.g., a cmdlet) and the shell, this error can be caught by the event detector 180 at a catch block (a block or application component configured to catch an exception). The error can then be serialized, or the entire context associated with the error can be serialized. This will make it easier to reproduce the error in a new session. Whenever a session event is detected, event detector 180 invokes serializing module 170 and directs serializing module 170 to serialize objects associated with the session event. The session event may include a single object or multiple objects. Session events may be generated due to the behavior of one or more objects. In one embodiment, the objects that caused the console event are provided to serializing module 170 for serializing. Additionally, an object or objects may be generated as a result of the session event. Such objects may be provided to serializing module 170 for serializing.

One example of a session event is a runtime exception, which may cause the Powershell session 125 to prematurely terminate (crash). When a Powershell session closes, the contents of the Powershell session are typically lost. Therefore, it can be difficult to determine what caused the Powershell session to close. However, event detector 180 may automatically invoke the serializing module 170, which can then serialize any objects that existed in the Powershell session (e.g., objects that caused the session event and/or objects that were generated as a result of the session event) prior to the Powershell session's termination. Accordingly, in one embodiment, the serializing module 170 traps session events that cause runtime exceptions, and serializes them into object representations.

The object representations generated from the session events may form a persistent log 134 in the database 120. This persistent log 134 may be used, for example, for debugging purposes. For example, a log 134 that includes object representations generated from runtime exceptions may be loaded into another Powershell session, and the object or objects that caused the runtime exception may be analyzed.

Figure 2:
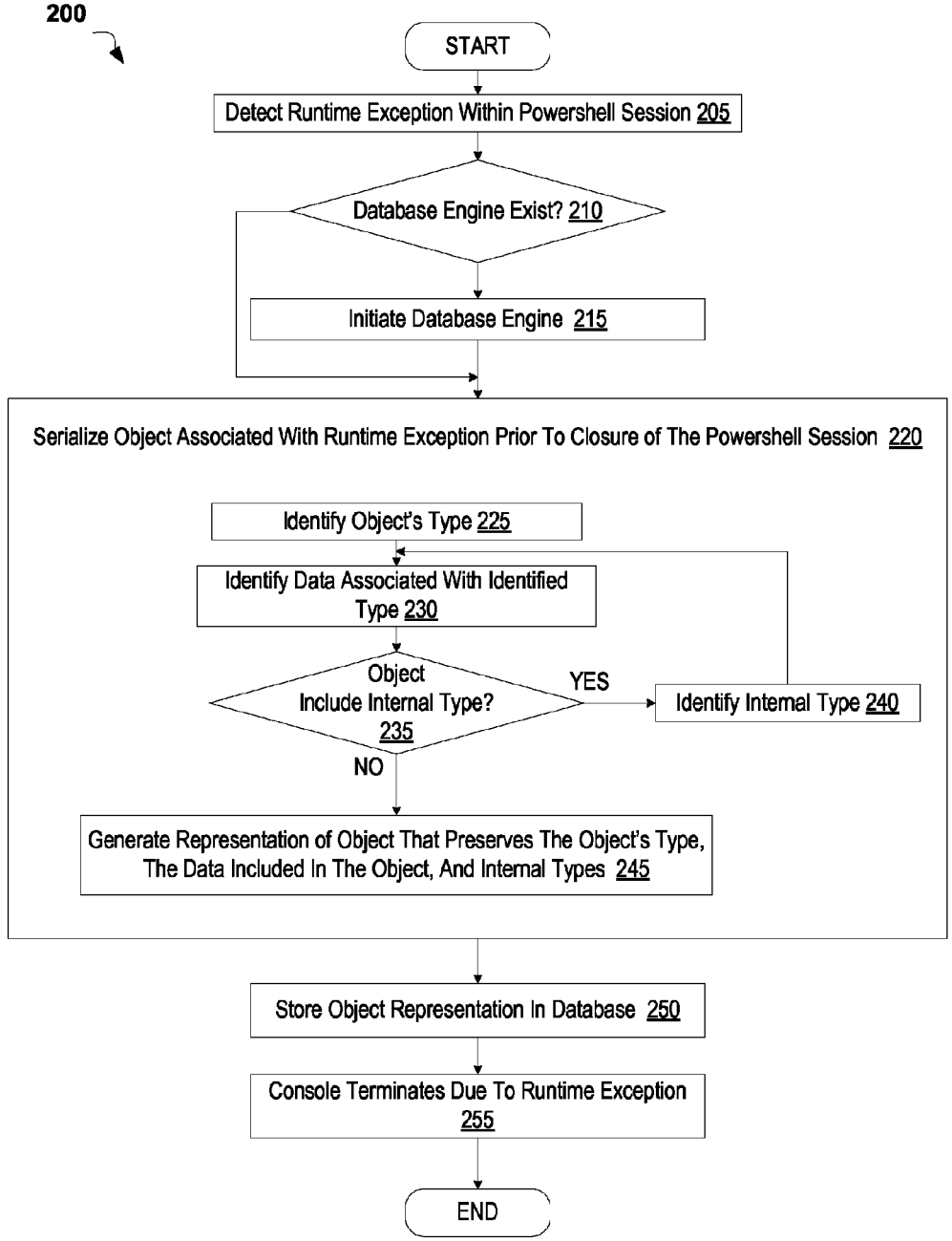
FIG. 2 is a flow diagram illustrating a method of logging a runtime exception or other session event in a Powershell session, in accordance with one embodiment of the invention.

FIG. 2 is a flow diagram illustrating a method 200 of logging a runtime exception or other session event in a Powershell session, in accordance with one embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by a machine (e.g., machine 110 of FIG. 1) executing an event detector, a serializing module, and/or a database engine within a Powershell session.

At block 205 of method 200, processing logic detects a runtime exception within a shell session (e.g., within a Powershell session). The runtime exception may be caused by an object in the shell session. In one embodiment, a runtime exception object is generated as a result of the runtime exception. The runtime exception object may be generated from a superclass of all classes that represent exceptional conditions which occur while a command is running (e.g. as a result of executing an application such as a cmdlet) within a Powershell session. In one embodiment, a runtime exception object is generated from a runtimeexception base class. The runtime exception object may include an error message as well as a stack trace and information about the source of the error (e.g., information about an object that caused the runtime exception).

At block 210, processing logic determines whether a database engine exists (has been loaded within the Powershell session). If the database engine exists, the method proceeds to block 220. If the database engine does not exist, the method continues to block 215, and the database engine is initiated.

At block 220, processing logic automatically serializes one or more objects associated with the runtime exception. In one embodiment, processing logic serializes an object that caused the runtime exception. In another embodiment, processing logic serializes a runtime exception object that was generated as a result of the runtime exception. Alternatively, processing logic may serialize both a runtime exception object and an object or objects that caused the runtime exception.

In one embodiment, at block 225, processing logic identifies the object's type. At block 230, processing logic identifies data included in the object associated with that type. At block 235, processing logic determines whether the object includes any internal types. If the object does include an internal type, the method continues to block 240. Otherwise, the method proceeds to block 245.

At block 240, processing logic identifies an internal type. The method then returns to block 230, and data associated with that internal type is identified. The method then continues to block 235, and processing logic again determines if there are any additional internal types in the object.

At block 245, processing logic generates a representation of the object that preserves the object's type and any internal types of the object. The representation further preserves data associated with each of the preserved data types. In one embodiment, the representation of the object is generated as types and data associated with those types are identified. Alternatively, the representation may be generated as a final step in the serialization process after all types and associated data have been identified.

At block 250, processing logic stores the object representation in the database. At block 255, the session may terminate due to the runtime exception. Normally, the cause for the runtime exception would then be lost. However, since the object or objects associated with the runtime exception have been serialized and sent to the database, the object or objects may be recreated, and the cause of the runtime exception may be analyzed.

Figure 3:
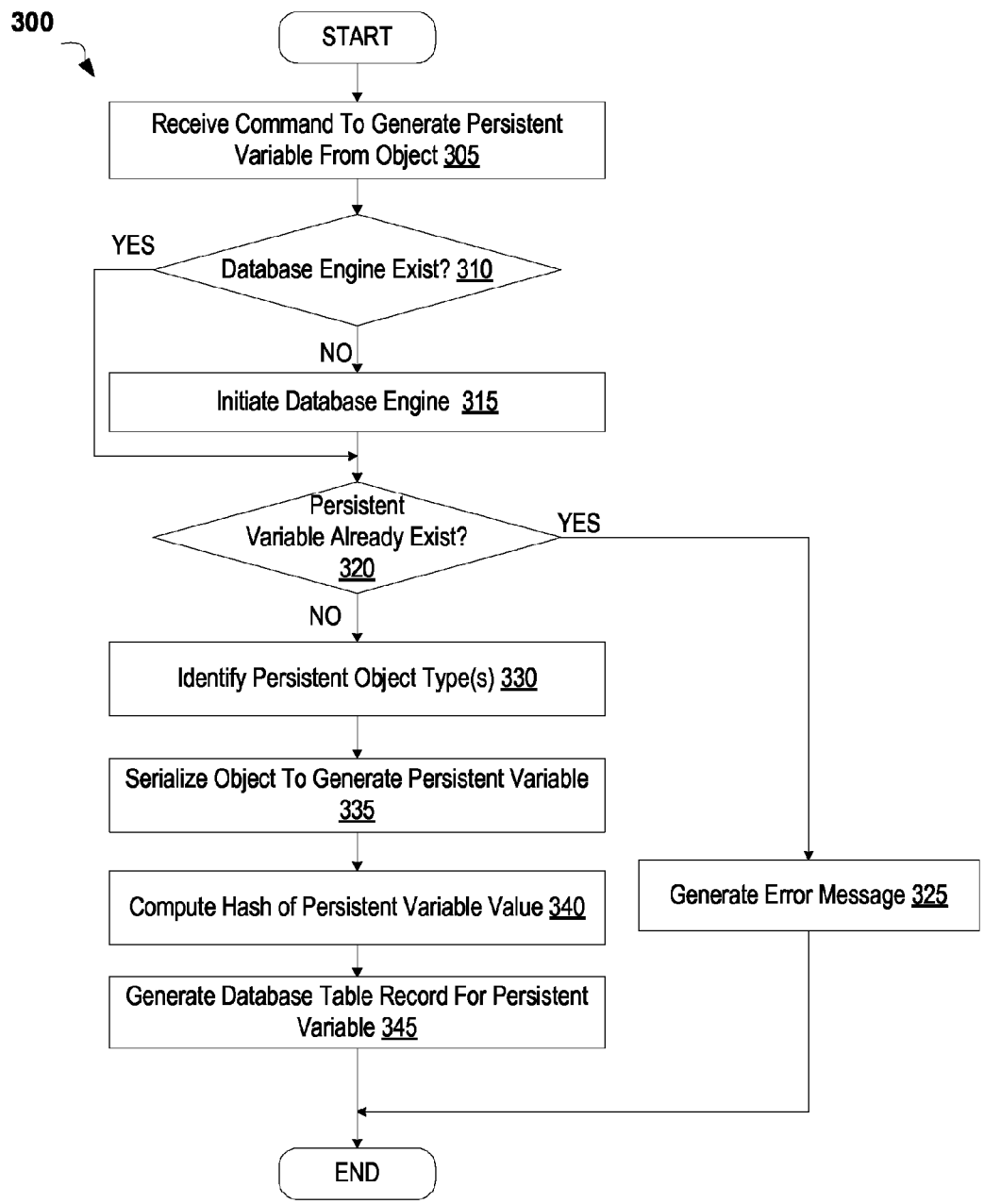
FIG. 3 is a flow diagram illustrating a method of generating a persistent variable in a Powershell session, in accordance with another embodiment of the invention.

FIG. 3 is a flow diagram illustrating a method 300 of generating a persistent variable (object representation) in a Powershell session, in accordance with another embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by a machine (e.g., machine 110 of FIG. 1) executing a serializing module and/or a database engine within a Powershell session.

At block 305, processing logic receives a command to generate a persistent variable. The command may include an identifier of an object from which to generate the persistent variable. At block 310, processing logic determines whether a database engine exists (has been loaded within the Powershell session). If the database engine exists, the method proceeds to block 320. If the database engine does not exist, the method continues to block 315, and the database engine is initiated.

At block 320, processing logic determines whether a persistent variable has already been generated from the object. This may be determined by checking to see if a persistent variable having a specific name is stored in the database. A deterministic naming scheme may be used, so that a persistent variable generated from the same object will have the same name. If a persistent variable has already been generated from the object, the method proceeds to block 325 and an error is generated. If a persistent variable has not been generated from the object, the method continues to block 330.

At block 330, processing logic identifies the object's type or types. This may include identifying any internal types of the object and data associated with those internal types. At block 335, processing logic serializes the object to generate a persistent variable value. The serialized object may be a string of data that includes information on the objects type (or types) and data associated with those types. In one embodiment, blocks 330 and 335 operate consecutively one type at a time. Therefore, block 330 may identify a first type and data associated with that first type, and then block 335 may add that information to the representation. Processing logic may then identify another type and data associated with that type, and then add that information to the representation, and so on.

At block 340, processing logic generates a hash of the persistent variable. The hash may be generated using any hashing function, such as message digest algorithm 5 (MD5), Bernstein hash function, Jenkins hash function, and so on.

At block 335, processing logic stores the persistent variable in a database table record with the persistent variable's name. The method then ends.

Figure 4:
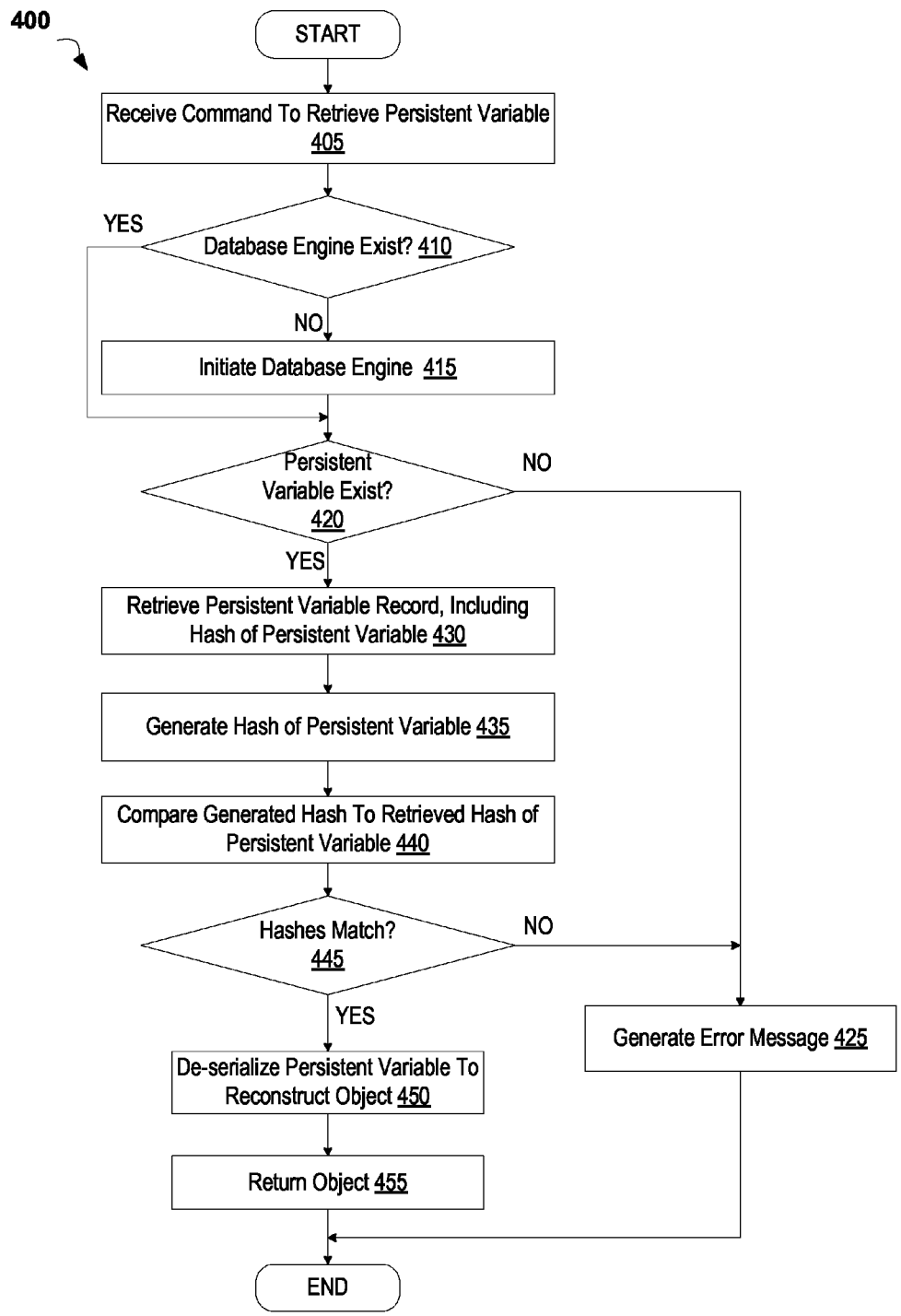
FIG. 4 is a flow diagram illustrating a method of retrieving a persistent variable in Powershell session, in accordance with one embodiment of the invention.

FIG. 4 is a flow diagram illustrating a method 400 of retrieving a persistent variable (object representation) in a Powershell session, in accordance with one embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by a machine (e.g., machine 110 of FIG. 1) executing a de-serializing module and/or a database engine within a Powershell session.

At block 405 of method 400, processing logic receives a command to retrieve a persistent variable. At block 410, processing logic determines whether a database engine exists (has been loaded within the Powershell session). If the database engine exists, the method proceeds to block 420. If the database engine does not exist, the method continues to block 415, and the database engine is initiated.

At block 420, processing logic determines whether the requested persistent variable exists in the database. If the persistent variable does not exist, then the method proceeds to block 425, and an error is generated. If the persistent variable exists, the method continues to block 430.

At block 430, processing logic retrieves a persistent variable record from the database. The persistent variable record may include the requested persistent variable, and may further include a hash of the persistent variable.

At block 435, processing logic generates a hash of the persistent variable. At block 440, processing logic compares the generated hash to the retrieved hash that was included in the persistent variable record. If the hashes match, then it can be concluded that the persistent variable has not been corrupted or otherwise modified since it was stored in the database. Thus, if at block 445 the hashes match, the method continues to block 455, and the persistent variable is de-serialized to reconstruct an object that was originally serialized into the persistent variable. The object is then returned to a requestor at block 460. If the hashes do not match, the method continues to block 425, and processing logic generates an error message.

Figure 5:
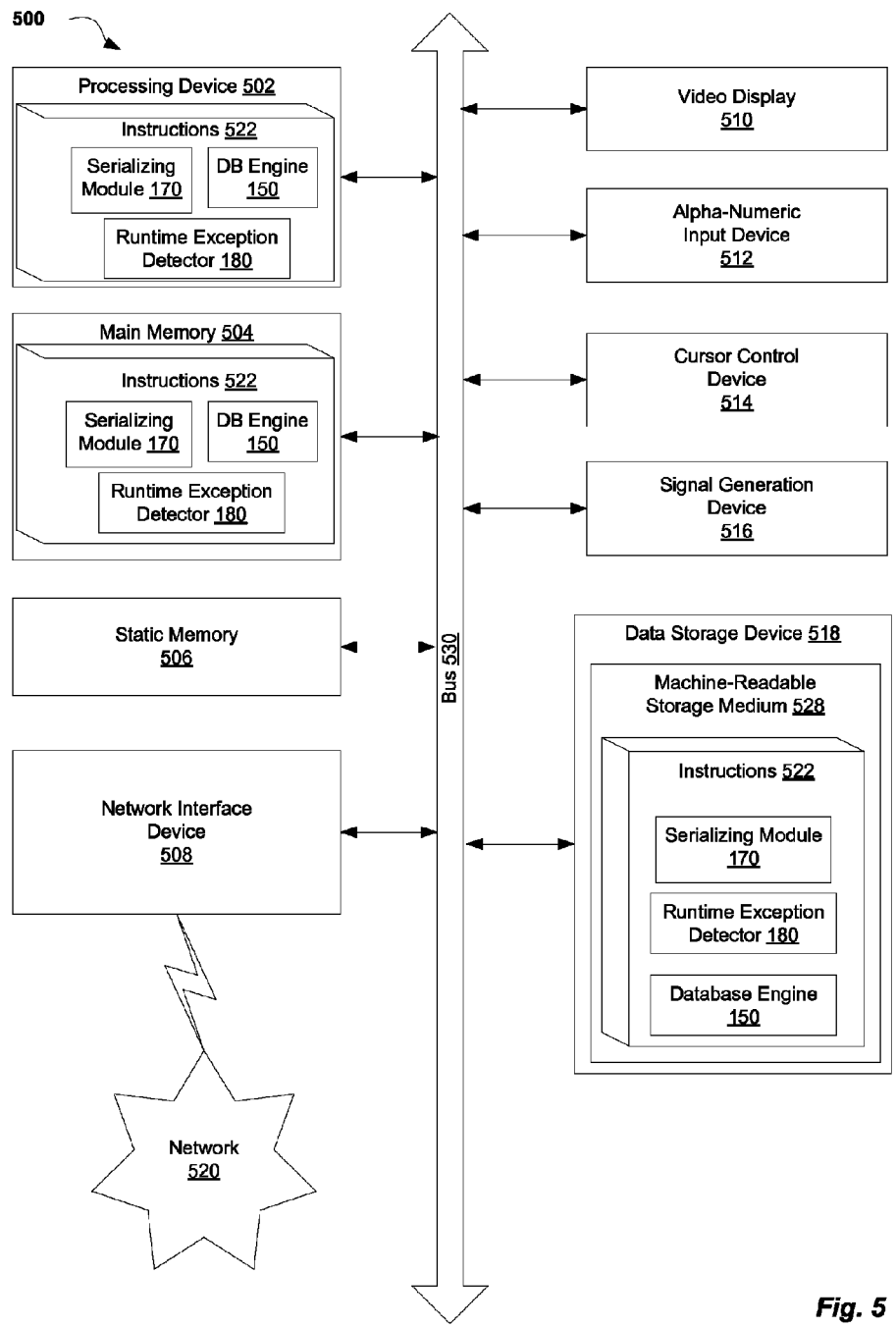
FIG. 5 is a block diagram illustrating one embodiment of a computer system.

FIG. 5 is a block diagram of a computer system 500 for performing customized monitoring of system activities using a performance monitor according to one embodiment of the invention. Within the computer system 500 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, random access memory (RAM), dynamic RAM (DRAM) such as synchronous DRAM (SDRAM), DRAM (RDRAM), etc.), a static memory 506 (e.g., flash memory, static random access memory (SRAM), etc.), and a secondary memory 518 (e.g., a data storage device in the form of a drive unit, which may include fixed or removable machine-accessible or computer-readable storage medium), which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic 526 for performing the operations and methods discussed herein.

The computer system 500 may further include a network interface device 508. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 516 (e.g., a speaker).

The data storage device 518 may include a machine-accessible storage medium (or a computer-readable storage medium) 528 on which is stored one or more sets of instructions 522 (e.g., serialization module 170, event detector 180, database engine 160, etc.) embodying any one or more of the methodologies or functions described herein. The instructions may also reside, completely or at least partially, within the main memory 504 and/or within the processing device 502 during execution thereof by the computer system 500, the main memory 504 and the processing device 502 also constituting machine-readable storage media.

The machine-readable storage medium 528 may also be used to store the instructions 522 persistently. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "detecting", "serializing", "identifying", "selecting", "generating", "searching", "creating", "choosing", "saving", "storing", "requesting", "executing", "loading", "monitoring", "associating", "returning", "localizing", "enabling", "running", "de-serializing", "determining", "performing", "facilitating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as ROM, RAM, magnetic disk storage media, optical storage media, flash memory devices, etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    detecting, by a processing device during a shell session, a runtime exception that causes the shell session to terminate; and
    serializing, by the processing device, an object associated with the runtime exception prior to closure of the shell session, the serializing comprising:
        identifying the object's type;
        identifying data associated with the object's type;
        identifying internal types of the object;
        for each of the internal types, identifying data associated with that internal type;
        generating a representation of the object that preserves the object's type, the data associated with the object's type, the internal types of the object, and the data associated with each of the internal types; and
        providing the representation of the object to one or more other shell sessions to enable the one or more other shell sessions to reconstruct the object, wherein the reconstructed object comprises the object's type, the data associated with the object's type, the internal types of the object, and the data associated with each of the internal types;
    receiving a request for the representation of the object from within an additional shell session of the one or more other shell sessions;
    retrieving the representation of the object; and
    de-serializing the representation of the object in the additional shell session to reconstruct the object.

2. The method of claim 1, further comprising:
    initiating a database engine in the shell session, wherein the database engine establishes a connection with a specified database upon being initiated; and
    storing the representation of the object as an entry in the specified database.

3. The method of claim 1, further comprising:
    generating a hash of the representation; and
    associating the hash with the representation.

4. The method of claim 1, wherein the shell session communicates with the additional shell session using the representation of the object.

5. The method of claim 1, wherein the representation of the object is stored in a database along with a hash of the representation that was generated when the representation was generated, the method further comprising prior to de-serializing the representation of the object:
    generating an additional hash of the representation;
    comparing the hash to the additional hash; and
    de-serializing the representation of the object upon determining that the hash matches the additional hash.

6. The method of claim 1, wherein the shell session is a Powershell session that uses a .NET framework.

7. The method of claim 1, wherein the object is a runtime exception object that was automatically generated when the runtime exception occurred.

8. A non-transitory computer readable storage medium including instructions that, when executed by a processing device, cause the processing device to perform operations comprising:
    serializing, by the processing device, an object from within a shell session prior to closure of the shell session, the serializing comprising:
        identifying the object's type;
        identifying data associated with the object's type;
        identifying internal types of the object;
        for each of the internal types, identifying data associated with that internal type;
        generating a representation of the object that preserves the object's type, the data associated with the object's type, the internal types of the object, and the data associated with each of the internal types, wherein the representation causes the object to be persistent and re-creatable; and
        providing the representation of the object to one or more other shell sessions to enable the one or more other shell sessions to reconstruct the object, wherein the reconstructed object comprises the object's type, the data associated with the object's type, the internal types of the object, and the data associated with each of the internal types;
    receiving a request for the representation of the object from within an additional shell session of the one or more other shell sessions;
    retrieving the representation of the object; and
    de-serializing the representation of the object in the additional shell session to reconstruct the object.

9. The non-transitory computer readable medium of claim 8, wherein the object is associated with a runtime exception that causes the shell session to terminate, the operations further comprising:
    detecting the runtime exception; and
    serializing the object associated with the runtime exception prior to closure of the shell session.

10. The non-transitory computer readable medium of claim 8, the operations further comprising:
- initiating a database engine in the shell session, wherein the database engine establishes a connection with a specified database upon being initiated; and
- storing the representation of the object as an entry in the specified database.

11. The non-transitory computer readable medium of claim 8, the operations further comprising:
- generating a hash of the representation; and
- associating the hash with the representation.

12. The non-transitory computer readable medium of claim 8, wherein the representation of the object is stored in a database along with a hash of the representation that was generated when the representation was generated, the operations further comprising prior to de-serializing the representation of the object:
- generating an additional hash of the representation;
- comparing the hash to the additional hash; and
- de-serializing the representation of the object upon determining that the hash matches the additional hash.

13. A computing device, comprising:
- a memory to store instructions for a serializing module; and
- a processing device to execute the instructions, wherein the instructions cause the processing device to:
  - detect, during a shell session, a runtime exception that causes the shell session to terminate; and
  - serialize an object associated with the runtime exception prior to closure of the shell session, the serializing comprising:
    - identifying the object's type;
    - identifying data associated with the object's type;
    - identifying internal types of the object;
    - for each of the internal types, identifying data associated with that internal type;
    - generating a representation of the object that preserves the object's type, the data associated with the object's type, the internal types of the object, and the data associated with each of the internal types; and
    - providing the representation of the object to one or more other shell sessions to enable the one or more other shell sessions to reconstruct the object, wherein the reconstructed object comprises the object's type, the data associated with the object's type, the internal types of the object, and the data associated with each of the internal types;
  - receive a request for the representation of the object from within an additional shell session of the one or more other shell sessions;
  - retrieve the representation of the object; and
  - de-serialize the representation of the object in the additional shell session to reconstruct the object.

14. The computing device of claim 13, further comprising the instructions to cause the processing device to:
- initiate a database engine in the shell session, wherein the database engine establishes a connection with a specified database upon being initiated; and
- store the representation of the object as an entry in the specified database.

15. The computing device of claim 13, further comprising the instructions to cause the processing device to:
- generate a hash of the representation; and
- associate the hash with the representation.

16. The computing device of claim 13, wherein the shell session communicates with the additional shell session using the representation of the object.

17. The computing device of claim 13, wherein the representation of the object is stored in a database along with a hash of the representation that was generated when the representation was generated, the instructions further to cause the processing device to, prior to de-serializing the representation of the object:
- generate an additional hash of the representation;
- compare the hash to the additional hash; and
- de-serialize the representation of the object upon determining that the hash matches the additional hash.

18. The computing device of claim 13, wherein the object is a runtime exception object that was automatically generated when the runtime exception occurred.

* * * * *